US008693887B2

(12) United States Patent
Nakamoto

(10) Patent No.: US 8,693,887 B2
(45) Date of Patent: Apr. 8, 2014

(54) OPTICAL TRANSMITTER AND OPTICAL TRANSMISSION SYSTEM

(75) Inventor: Hiroshi Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1506 days.

(21) Appl. No.: 11/978,682

(22) Filed: Oct. 30, 2007

(65) Prior Publication Data

US 2008/0085127 A1 Apr. 10, 2008

(30) Foreign Application Priority Data

Nov. 6, 2006 (JP) ................................. 2006-300718

(51) Int. Cl.
*H04B 10/00* (2013.01)
*H04B 10/2513* (2013.01)

(52) U.S. Cl.
CPC ................................ *H04B 10/25137* (2013.01)
USPC ........................................................ 398/162

(58) Field of Classification Search
CPC ................................................ H04B 10/25137
USPC ................................................ 398/199, 162
See application file for complete search history.

(56) References Cited

U.S. PATENT DOCUMENTS 3,694,758 A * 9/1972 Dyer ............................ 327/295
4,658,225 A * 4/1987 Dukes et al. .................. 333/166
5,023,486 A * 6/1991 Gongwer ........................ 326/38
5,184,243 A * 2/1993 Henmi et al. ................. 398/147
5,491,440 A * 2/1996 Uehara et al. ................. 327/172
6,693,929 B1 * 2/2004 Essiambre et al. .............. 372/26
6,721,081 B1 * 4/2004 Mauro et al. .................. 359/279
6,920,262 B2 * 7/2005 Van Tuyl ........................ 385/24
6,972,842 B2 * 12/2005 Doerr et al. ................... 356/364
7,024,056 B2 * 4/2006 Griffin ............................. 385/1
7,062,176 B2 * 6/2006 Liu et al. ....................... 398/159
7,068,950 B2 * 6/2006 Sinsky .......................... 398/198
7,277,645 B2 * 10/2007 Gill et al. ...................... 398/185
7,292,793 B2 * 11/2007 Bergano ........................ 398/183
7,330,666 B1 * 2/2008 Koley ........................... 398/188
7,336,728 B2 * 2/2008 Dorrer et al. .................. 375/308

(Continued)

FOREIGN PATENT DOCUMENTS

EP 1 404 037 3/2004
JP 10-51389 2/1998

OTHER PUBLICATIONS

Winzer, P. J., et al. "Chirped Return-to-Zero Modulation by Imbalanced Pulse Carver Driving Signal." IEEE Photonics Technology Letters, IEEE Service Center, Piscataway, NJ, US, vol. 16, No. 5, May 2004, pp. 1379-1381.

(Continued)

*Primary Examiner* — Danny Leung
(74) *Attorney, Agent, or Firm* — Fujitsu Patent Center

(57) ABSTRACT

An optical transmitter of the invention phase modulates an output light from a light source according to data using a phase modulator, and then supplies it to an intensity modulator. The intensity modulator performs pulse carving of the output light from the phase modulator in accordance with a clock signal in which a duty cycle is changed to a value different from 50% by a waveform transformation circuit, with an operating range being a slope from a trough to a crest in the photoelectric response characteristics. As a result, it is possible to realize, at the same time, duty cycle and chirp characteristics that enable excellent transmission characteristics to be obtained.

9 Claims, 9 Drawing Sheets

(56) References Cited

U.S. PATENT DOCUMENTS

| | | | | |
|---|---|---|---|---|
| 7,369,778 | B2 * | 5/2008 | Liu et al. | 398/148 |
| 7,466,877 | B2 * | 12/2008 | Tian | 385/4 |
| 7,558,479 | B1 * | 7/2009 | Robinson | 398/28 |
| 2001/0053165 | A1 * | 12/2001 | Wang et al. | 372/38.02 |
| 2003/0007216 | A1 * | 1/2003 | Chraplyvy et al. | 359/161 |
| 2003/0112487 | A1 * | 6/2003 | Fuller et al. | 359/239 |
| 2003/0218790 | A1 * | 11/2003 | Mikkelsen et al. | 359/238 |
| 2004/0208648 | A1 * | 10/2004 | Fishman et al. | 398/189 |
| 2008/0085127 | A1 * | 4/2008 | Nakamoto | 398/185 |

OTHER PUBLICATIONS

A.H. Gnauck et al., “Optical Phase-Shift-Keyed Transmission”, Journal of Lightwave Technology , vol. 23, No. 1, Jan. 2005; pp. 115-130.

Extended European Search Report issued by the European Patent Office for corresponding European Patent Application 07 021 078.6 mailed on Mar. 5, 2008.

* cited by examiner

STRUCTURAL EXAMPLE OF CONVENTIONAL RZ-DPSK OPTICAL TRANSMITTER

OPTICAL TRANSMITTER AND OPTICAL TRANSMISSION SYSTEM

BACKGROUND OF THE INVENTION

1. Field of the Invention

The present invention relates to an optical transmitter and an optical transmission system that transmit an optical signal of a phase modulation format. In particular, it relates to an optical transmitter corresponding to a modulation format in which light whose phase is modulated according to data is intensity modulated in accordance with a clock to generate RZ pulses, and an optical transmission system that transmits a wavelength division multiplexed (WDM) light using a plurality of these optical transmitters.

2. Description of the Related Art

In long distance WDM transmission, as a format for modulating the optical signal transmitted, an RZ-DPSK (Differential Phase Shift Keying) modulation format or an RZ-DQPSK (Differential Quadrature Phase Shift Keying) modulation format has superior characteristics in regards to receiver sensitivity and the like than a conventionally used RZ (Return to Zero) modulation format.

In the above-described RZ-DPSK or RZ-DQPSK modulation format, at first a data signal is superimposed on light by phase modulation, and is then intensity modulated by a clock signal (or a signal divided from a clock) to make an RZ signal.

FIG. 11 is a structural example of a conventional optical transmitter in which an RZ-DPSK modulation format is used. In the conventional optical transmitter, a continuous light CW output from a light source 11, whose wavelength and output level are variable, is DPSK modulated by a phase modulator 12 according to data, and is then converted to RZ pulses by an intensity modulator 13 in accordance with a clock, and thereby an optical signal of an RZ-DPSK modulation format is output. A drive signal corresponding to data from a driver circuit 12A and a control signal from a bias stabilizing circuit 12B are applied to the phase modulator 12. Furthermore, a drive signal corresponding to the clock from a driver circuit 13A and a control signal from a bias stabilizing circuit 13B are applied to the intensity modulator 13. A multiplexer circuit (MUX) 14 multiplexes a plurality of data signals supplied externally to generate a high bit rate data signal DATA, and also generates a clock signal CLK having a frequency corresponding to the bit rate of the data signal DATA. A precoder 15 performs an encoding process in which differential information between the current symbol and the symbol one bit prior is reflected, using the data signal DATA from the multiplexer circuit 14, generates a modulation signal Q according to the data and an inverted signal Q', outputs them to the driver circuit 12A, and also outputs a clock signal CLK (or a signal divided from a clock signal CLK) synchronized with the signals Q and Q' to the driver circuit 13A. The bias stabilizing circuits 12B and 13B are circuits for compensating for the drift of operating points due to temperature change or the like by optimizing DC biases applied to the phase modulator 12 and the intensity modulator 13.

In the above-described conventional optical transmitter, a modulation process in which the output light from the phase modulator 12 is made into an RZ signal by the intensity modulator 13 is designated a pulse carver. A well known pulse carver has three methods, wherein the intensity modulator 13 has different operating points as shown in FIG. 12 for example, and the duty cycle of the RZ signal after being carved is known to be different for each method as shown for example in FIG. 13 (for example, refer to A. H. Gnauck, P. J. Winzer, "Optical Phase-Shift-Keyed Transmission", JOURNAL OF LIGHTWAVE TECHNOLOGY, VOL. 23, NO. 1, JANUARY 2005, pp. 115-130).

To be specific, in a method (refer to arrow A of FIG. 12) in which pulse carving is performed by a clock signal CLK between an adjacent trough and crest in the photoelectric response characteristics of the intensity modulator 13, the duty cycle of the RZ signal is 50% (refer to FIG. 13 (A)). Furthermore, in a method (refer to arrow B of FIG. 12) in which pulse carving is performed by a clock signal CLK between adjacent troughs in the photoelectric response characteristics of the intensity modulator 13, the duty cycle of the RZ signal is 33% (refer to FIG. 13(B)). Moreover, in a method (refer to arrow C of FIG. 12) in which pulse carving is performed by a divided clock signal between adjacent crests in the photoelectric response characteristics of the intensity modulator 13, the duty cycle of the RZ signal is 67% (refer to FIG. 13 (C)). On the other hand, as the duty cycle of an RZ signal for which excellent transmission characteristics can be obtained, approximately 65% is generally known to be the most suitable.

The duty cycle in the present specification means the value of the ratio of the pulse width on the high level side with respect to one cycle of a signal waveform, expressed as a percentage. In the case of an optical signal, it is the value of the ratio of the pulse width (pulse width at a level where the intensity of the light pulse is 3 dB lower than its peak) on the emission side with respect to one cycle of a light pulse, expressed as a percentage.

Incidentally, in an optical transmitter in which an intensity modulator as described above is used, there is a case in which a phenomenon (wavelength chirp) occurs whereby the wavelength of a light fluctuates at the time of modulation. The wavelength chirp becomes the main cause of waveform deterioration due to an SPM-GVD effect caused by self phase modulation (SPM) and group velocity dispersion (GVD) occurring in a transmission path. In order to limit waveform deterioration due to the SPM-GVD effect, there are desirable chirp characteristics in optical transmitters used in long distance WDM transmission. Normally, chirp characteristics in which an $\alpha$ parameter indicating wavelength chirp generated, is greater than or equal to 0.7 to 1 is the most suitable.

However, in the aforementioned pulse carver, the $\alpha$ parameter in the case where the duty cycle of the RZ signal is 50% is 1 or −1. Here, $\alpha$=1 or −1 is the case of an ideal Z-cut $LiNbO_3$ modulator. Depending on the design of the electrodes, it may be 0.7 to 1, or −0.7 to −1. However, since there is a similar effect in improvement of waveform deterioration due to the SPM-GVD effect, for simplicity, in the following discussion, $\alpha$=1 or −1. To be specific, as the operating range of the intensity modulator, in the case where the slope of a trough to a crest of the photoelectric response characteristics is used, $\alpha$=1, and conversely, in the case where the slope of a crest to a trough is used, $\alpha$=−1. Moreover, in the cases where the duty cycles of the RZ signal are 33% and 67%, the chirp characteristics change for each single bit, which causes waveform deterioration. In the structure of the conventional optical transmitter as shown in FIG. 11 described previously, the duty cycle of the output light is fixed. Therefore, there is a problem in that it is difficult to satisfy, at the same time, the duty cycle and the chirp characteristics most suitable for realizing excellent transmission characteristics.

In Japanese Unexamined Patent Publication No. 10-51389, a technique is described in which the duty ratio of an output light is varied in regards to an optical transmitter of an NRZ (Non Return to Zero) modulation format. However, since the known technique is targeted at an NRZ modulation format, and is also aimed at making the duty ratios of the output light the same before and after chirp switching corresponding to the dispersion characteristics of a transmission path, even if such a technique is applied to an optical transmitter corresponding to a modulation format such as RZ-DQPSK or the like, it is difficult to limit waveform deterioration effectively due to the SPM-GVD effect described above.

SUMMARY OF THE INVENTION

The present invention addresses the above-described points, with an object of providing an optical transmitter and an optical transmission system that output an optical signal of a phase modulation format, that has been pulse carved, which can satisfy, at the same time, duty cycle and chirp characteristics that enable excellent transmission characteristics to be realized.

In order to achieve the above-described object, an aspect of an optical transmitter according to the present invention is an optical transmitter that comprises: a light source; a phase modulator into which a light output from the light source is input; a first drive circuit that drives the phase modulator according to a data signal; an intensity modulator into which the light whose phase is modulated by the phase modulator is input, and that has photoelectric response characteristics that change periodically; and a second drive circuit that drives the intensity modulator in accordance with a clock signal having a frequency corresponding to a bit rate of the data signal, and that outputs an optical signal of a phase modulation format, pulse carved by the intensity modulator, wherein there is provided a waveform transformation circuit that varies a duty cycle of the clock signal, and the second drive circuit drives the intensity modulator in accordance with a clock signal in which the duty cycle is changed to a different value from 50% by the waveform transformation circuit, with the operating range being a slope from a trough to a crest in the photoelectric response characteristics of the intensity modulator.

In the optical transmitter with the above-described construction, the output light from the light source is phase modulated by the phase modulator according to the data signal, and is then input to the intensity modulator. In the intensity modulator, pulse carving is performed by the input light being intensity modulated in accordance with the clock signal in which the duty cycle is changed to a value different from 50% by the waveform transformation circuit. At this time, since the intensity modulator is driven with the operating range being the slope from a trough to a crest in the photoelectric response characteristics, chirp characteristics with $\alpha$ parameter=1 can be obtained, enabling waveform deterioration due to the SPM-GVD effect to be limited effectively.

Furthermore, another aspect of the optical transmitter according to the present invention is an optical transmitter that comprises: a light source; phase modulator into which a light output from the light source is input; a first drive circuit that drives the phase modulator according to a data signal; an intensity modulator into which the light whose phase is modulated by the phase modulator is input, and that has photoelectric response characteristics that change periodically; and a second drive circuit that drives the intensity modulator in accordance with a clock signal having a frequency corresponding to a bit rate of the data signal, and that outputs an optical signal of a phase modulation format, pulse carved by the intensity modulator, wherein there is provided a bias shift circuit that offsets an operating point of the intensity modulator in a preset direction, and the second drive circuit drives the intensity modulator in accordance with the clock signal having a duty cycle of 50%, where the operating range is a slope from a trough to a crest in the photoelectric response characteristics of the intensity modulator, in a state in which an operating point located in a central part of the operating range is offset by the bias shift circuit.

In the optical transmitter with the above-described construction, the output light from the light source is phase modulated by the phase modulator according to the data signal, and is then input to the intensity modulator. In the intensity modulator, with the operating range being the slope from a trough to a crest in the photoelectric response characteristics, and in a state in which the operating point located in its central part is offset towards the crest side or the trough side, the input light is intensity modulated in accordance with the clock signal having a duty cycle of 50%, and thus pulse carving is performed. Regarding the chirp characteristics at this time, since the intensity modulator is driven in the above-described operating range, $\alpha$ parameter=1 is realized, and waveform deterioration due to the SPM-GVD effect can be limited effectively.

The optical transmission system according to the present invention is an optical transmission system in which a WDM light, in which a plurality of optical signals of different wavelengths is multiplexed, is transmitted between a transmitting terminal and a receiving terminal, wherein a plurality of the above-described optical transmitters of each aspect is provided in the transmitting terminal.

According to the optical transmitter of the present invention described above, since a waveform transformation circuit or a bias shift circuit is provided, and while the chirp characteristics are stabilized at $\alpha$ parameter=1, the duty cycle of a phase modulated light after pulse carving is changed from 50%, it is possible to satisfy, at the same time, duty cycle and chirp characteristics that enable excellent transmission characteristics to be realized. By constructing an optical transmission system using a plurality of such optical transmitters, it is possible to transmit a WDM light with excellent quality.

Other objects, features, and advantages of the present invention will become apparent from the following description of embodiments, in conjunction with the appended drawings.

DETAILED DESCRIPTION OF THE INVENTION

Hereunder is a description of a best mode for carrying out the present invention, with reference to the appended drawings. The same reference symbols denote the same or equivalent parts throughout all of the drawings.

Figure 1:
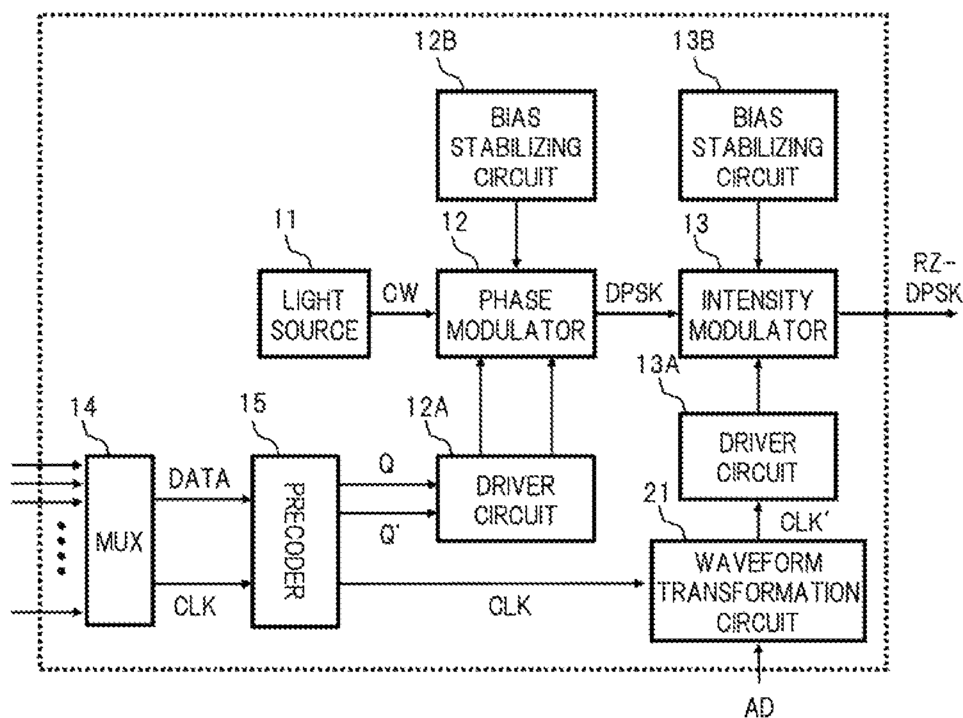
FIG. 1 is a block diagram showing the structure of an optical transmitter according to a first embodiment of the present invention.

FIG. 1 is a block diagram showing the structure of an optical transmitter according to a first embodiment of the present invention.

Figure 11:
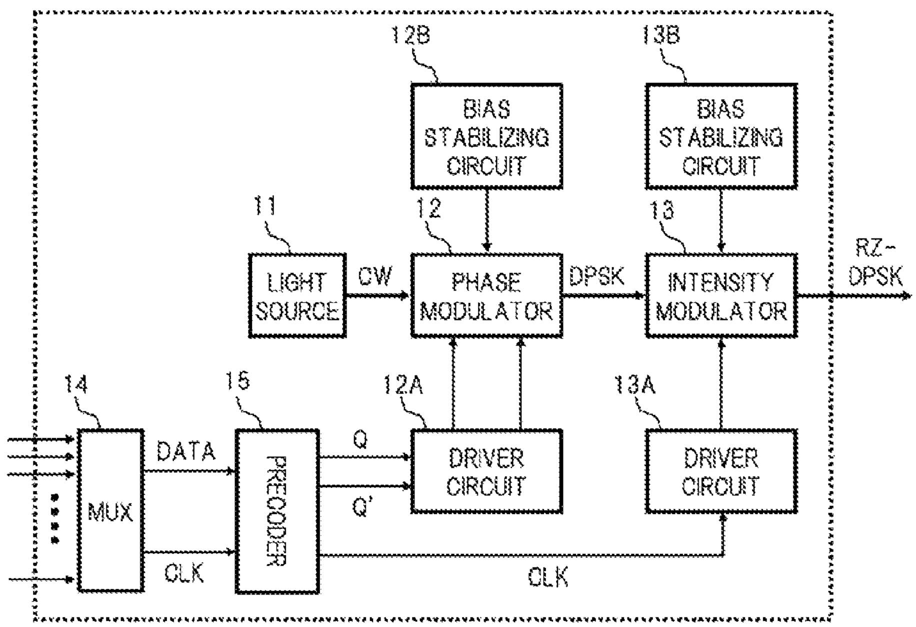
FIG. 11 is a block diagram showing a structural example of a conventional optical transmitter.

In FIG. 1, the present optical transmitter is provided for example with a waveform transformation circuit 21 in the conventional RZ-DPSK optical transmitter as shown in FIG. 11, that transforms the waveform of a clock signal CLK supplied from a precoder 15 to a driver circuit 13A that is associated with an intensity modulator 13 in which pulse carving is performed. A clock signal CLK' whose duty cycle is adjusted by the waveform transformation circuit 21 is input to the driver circuit 13A. The structure other than the point concerning the provision of the waveform transformation circuit 21, is basically the same as the conventional structure shown in FIG. 11.

To be specific, a light source 11 generates a continuous light CW having a required wavelength and optical power using for example a tunable laser diode or the like, and outputs the continuous light CW to a phase modulator 12.

For the phase modulator 12, a typical MZ type optical modulator or the like is used, in which a Mach-Zehnder (MZ) type optical waveguide is formed on a substrate having electro-optical effects, such as lithium niobate ($LiNbO_3$), and electrodes are provided in correspondence with a pair of branching waveguides of the MZ type optical waveguide. The continuous light CW is input from the light source 11 to one end of the optical waveguide. Moreover a DC bias that adjusts the modulating voltage and operating point according to the data supplied from the driver circuit 12A serving as a first drive circuit is applied to the electrodes. As a result, the phase of the light transmitted through each of the branching waveguides is changed according to the modulating voltage, and the DPSK modulated optical signal is output from the other end of the optical waveguide. The DC bias applied to the electrodes is controlled according to the output signal from a bias stabilizing circuit 12B such that operating point drift due to temperature change or the like is compensated.

Figure 12:
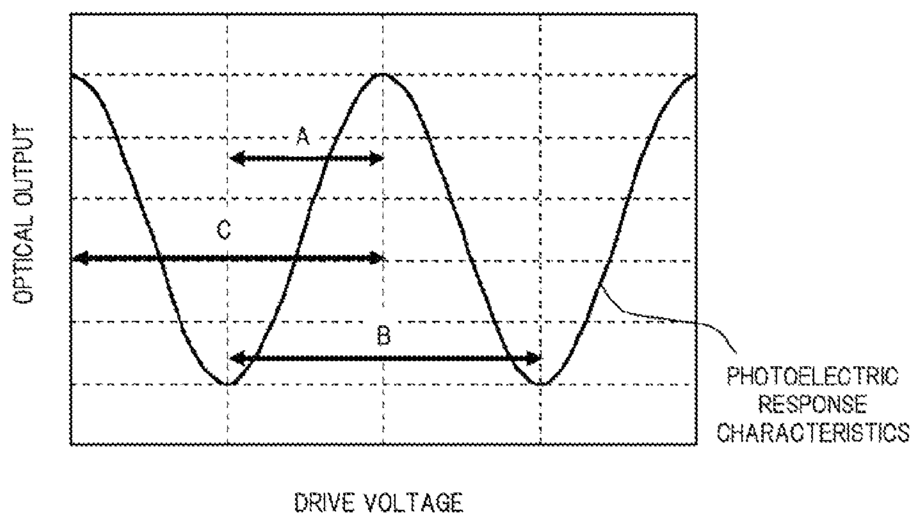
FIG. 12 is a diagram for explaining a conventional pulse carver method.
Figure 13:
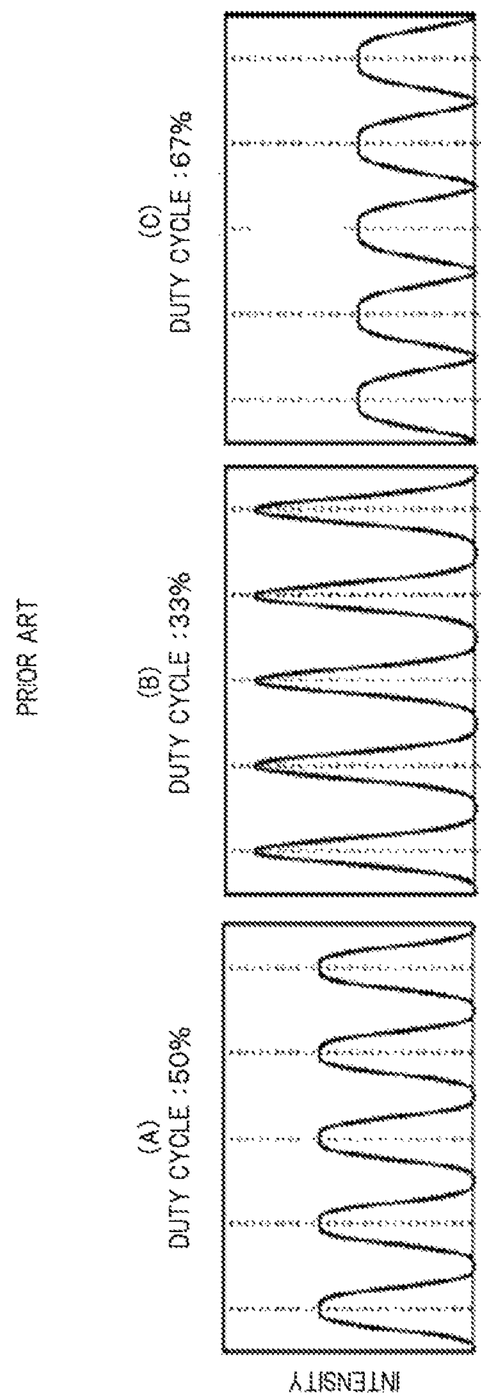
FIG. 13 is a diagram showing the duty cycles of optical signals corresponding to the conventional pulse carver method.

The intensify modulator 13 performs pulse carving of the optical signal that is DPSK modulated by the phase modulator 12 using for example an MZ type optical modulator or the like similar to the phase modulator 12. Regarding the intensify modulator 13, the slope from a trough to a crest in the photoelectric response characteristics of the MZ type optical modulator is designated the operating range such that α parameter=1 is obtained as the chirp characteristics (refer to the abovementioned arrow A of FIG. 12). Here, a DC bias that adjusts the modulating voltage and the operating point according to the clock supplied from the driver circuit 13A serving as a second drive circuit is applied to one of the electrodes corresponding to the pair of branching waveguides of the MZ type optical modulator, and the other electrode is grounded. The DC bias applied to the electrodes is also controlled according to the output signal from a bias stabilizing circuit 13B such that operating point drift due to temperature change or the like is compensated.

A multiplexer circuit (MUX) 14 multiplexes a plurality (for example 16) of data signals of a low bit rate (for example 600 Mbit/s) applied externally, and generates a data signal DATA of a high bit rate (for example 10 Gbit/s). Furthermore, the multiplexer circuit 14 generates a clock signal CLK having a frequency (for example 10 GHz) corresponding to the bit rate of the data signal DATA. The waveform of the clock signal CLK is a typical sine wave, and has a duty cycle of 50%.

The precoder 15 performs an encoding process in which differential information between the current symbol and the symbol one bit prior is reflected, using the data signal DATA from the multiplexer circuit 14, generates a modulation signal Q according to the data and an inverted signal Q', and outputs the modulation signals Q and Q' to the driver circuit 12A. Moreover, the precoder 15 outputs a clock signal CLK synchronized with the modulation signals Q and Q' to the waveform transformation circuit 21. In the driver circuit 12A that receives the modulation signals Q and Q' from the precoder 15, a modulating voltage to be applied to each electrode of the phase modulator 12 is generated according to the modulation signals Q and Q'.

The waveform transformation circuit 21 changes the duty cycle of the clock signal CLK from the precoder 15 from 50% according to a duty adjustment signal AD applied externally, and outputs the clock signal CLK' after the duty cycle change to the driver circuit 13A. In the driver circuit 13A that receives the clock signal CLK' from the waveform transformation circuit 21, a modulation voltage to be applied to one electrode of the intensity modulator 13 is generated according to the clock signal CLK'.

Figure 2:
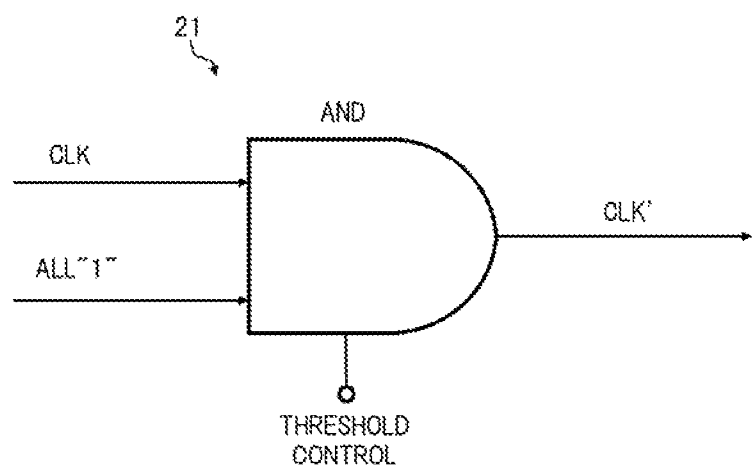
FIG. 2 is a diagram showing a structural example of a waveform transformation circuit used in the first embodiment.
Figure 3:
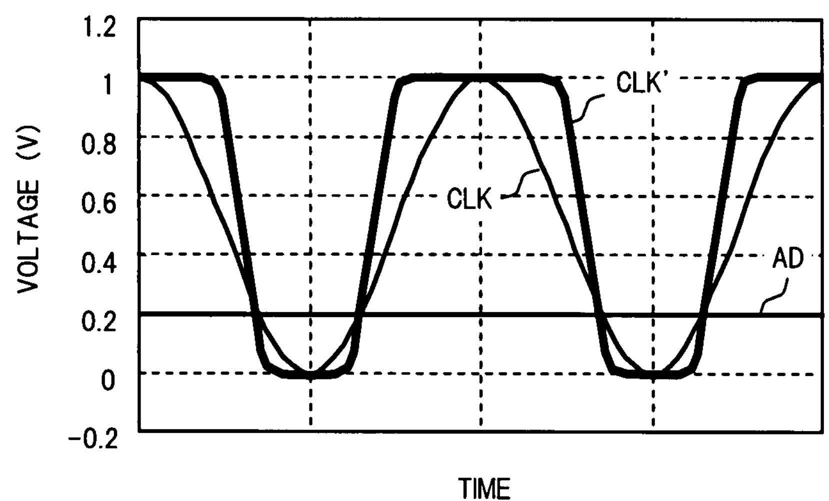
FIG. 3 is a diagram for explaining the processing in the waveform transformation circuit of the first embodiment.

FIG. 2 is a diagram showing one example of a specific structure of the abovementioned waveform transformation circuit 21. In the structural example of FIG. 2, the duty cycle of the clock signal CLK is changed from 50% using an AND operation circuit (AND circuit). To be specific, the clock signal CLK from the precoder 15 is applied to one input terminal of the AND circuit, the signal that shows all "1" is applied to the other input terminal of the AND circuit, and the external duty adjustment signal AD is applied to the threshold control terminal of the AND circuit. The duty adjustment signal AD is a threshold voltage level of for example 20% (0.2V in the example of FIG. 3), of the amplitude of the clock signal CLK as shown in FIG. 3, and 1 or 0 determination is performed at a level of 20% of the amplitude of the clock signal CLK by performing the AND operation on the clock signal CLK and the "1" signal in the AND circuit based on the duty adjustment signal AD. As a result a clock signal CLK' (thick line of FIG. 3) in which the waveform is changed to a waveform with a duty cycle of greater than 50% is output from the output terminal of the AND circuit.

Here, an example is shown in which the threshold voltage level of the duty adjustment signal AD is set to a level of 20% of the amplitude of the clock signal CLK. However, the threshold voltage level of the duty adjustment signal AD is not limited to the abovementioned example. By setting the duty adjustment signal AD to a level lower than 50% of the amplitude of the clock signal CLK, the duty cycle of the clock signal CLK' can be made greater than 50%. Furthermore, by setting the duty adjustment signal AD to a level higher than 50% of the amplitude of the clock signal CLK, the duty cycle of the clock signal CLK' can be made less than 50%.

Figure 4:
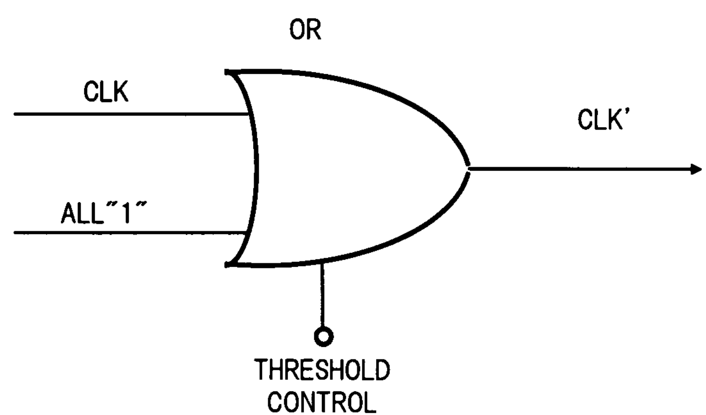
FIG. 4 is a diagram showing another structural example of the waveform transformation circuit used in the first embodiment.
Figure 5:
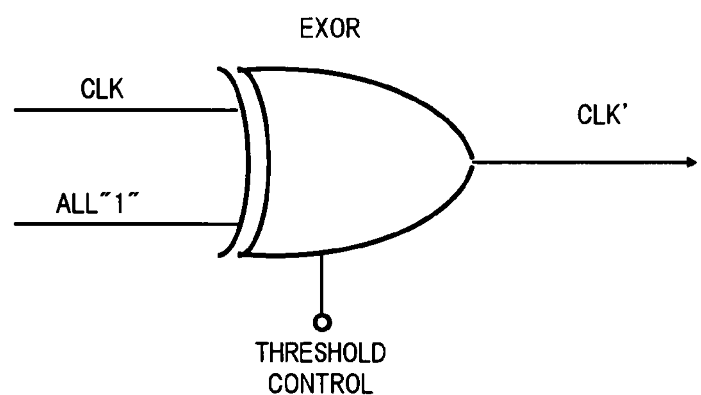
FIG. 5 is a diagram showing another structural example of the waveform transformation circuit used in the first embodiment.

Moreover, a structural example is shown in which an AND circuit is used as the waveform transformation circuit 21. However, it is also possible to use a structure that uses an OR circuit for example as shown in FIG. 4, or a structure that uses an EXCLUSIVE OR circuit (EXOR circuit) as shown in FIG. 5, as the waveform transformation circuit 21.

In an optical transmitter of the first embodiment having the above-described structure, the intensity modulator 13 is driven in accordance with the clock signal CLK' whose duty cycle is changed from 50% by the waveform transformation circuit 21 that was newly provided, and pulse carving of the optical signal that is DPSK modulated by the phase modulator 12 is performed by the intensity modulator 13.

Figure 6:
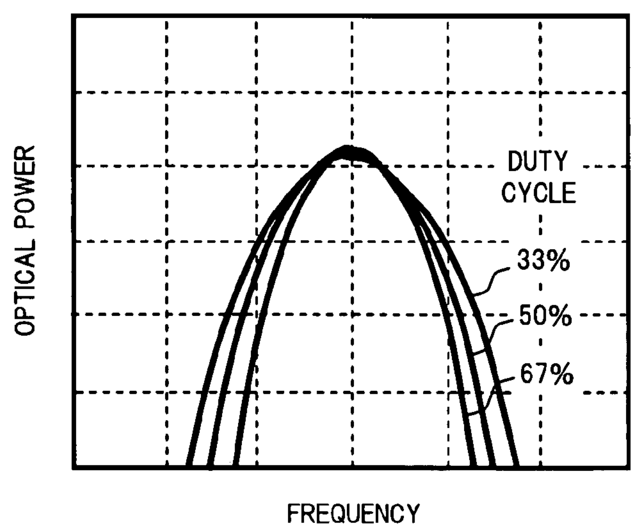
FIG. 6 is a diagram illustrating the relationship between the duty cycle and the width of the optical spectrum of an RZ-DPSK optical signal.

At this time, in the waveform transformation circuit 21, in the case where the DC level of the duty adjustment signal AD is set such that the duty cycle of the clock signal CLK' becomes greater than 50%, the duty cycle of the pulse carved RZ-DPSK optical signal also becomes greater than 50%. If the duty cycle increases, the width of the optical spectrum is limited, as shown in FIG. 6. As a result in the case where a WDM light of multiplexed RZ-DPSK optical signals of different wavelengths is transmitted, cross talk between adjacent channels can be reduced, which enables the spacing between channels to be reduced. Furthermore, regarding the chirp characteristics of the optical transmitter, since pulse carving is performed using the slope from a trough to a crest in the photoelectric response characteristics of the intensity modulator 13, a fixed state is realized in which the $\alpha$ parameter=1. Therefore, it is also possible to effectively limit waveform deterioration due to the SPM-GVD effect.

On the other hand, in the waveform transformation circuit 21, in the case where the DC level of the duty adjustment signal AD is set such that the duty cycle of the clock signal CLK' becomes less than 50%, the duty cycle of the pulse carved RZ-DPSK optical signal also becomes less than 50%. If the duty cycle is reduced, the width of the optical spectrum increases, as shown in FIG. 6. In this case, although it is difficult to reduce the spacing between the channels of the WDM light as when the duty cycle is increased, if the frequency characteristics of the optical receiver extend to high frequencies, it is possible to improve the receiver sensitivity. Moreover, regarding the chirp characteristics of the optical transmitter, similarly to the case where the duty cycle is increased, since a fixed state is realized in which the $\alpha$ parameter=1, it is also possible to effectively limit waveform deterioration due to the SPM-GVD effect.

As examples of an optical spectrum in the case where the duty cycle is changed from 50%, FIG. 6 shows cases of duty cycles of 67% and 33%. However, the duty cycle after the change in the present invention is not limited to the examples. It is possible to set the duty cycle optimized according to the various conditions of the optical transmission system in which the present optical transmitter is used.

As described above, according to the optical transmitter of the first embodiment, since the waveform transformation circuit 21 is provided, and the duty cycle of the clock signal used for pulse carving is changed from 50%, it is possible to satisfy, at the same time, duty cycle and chirp characteristics that enable excellent transmission characteristics to be realized.

Next is a description of a second embodiment of the present invention.

Figure 7:
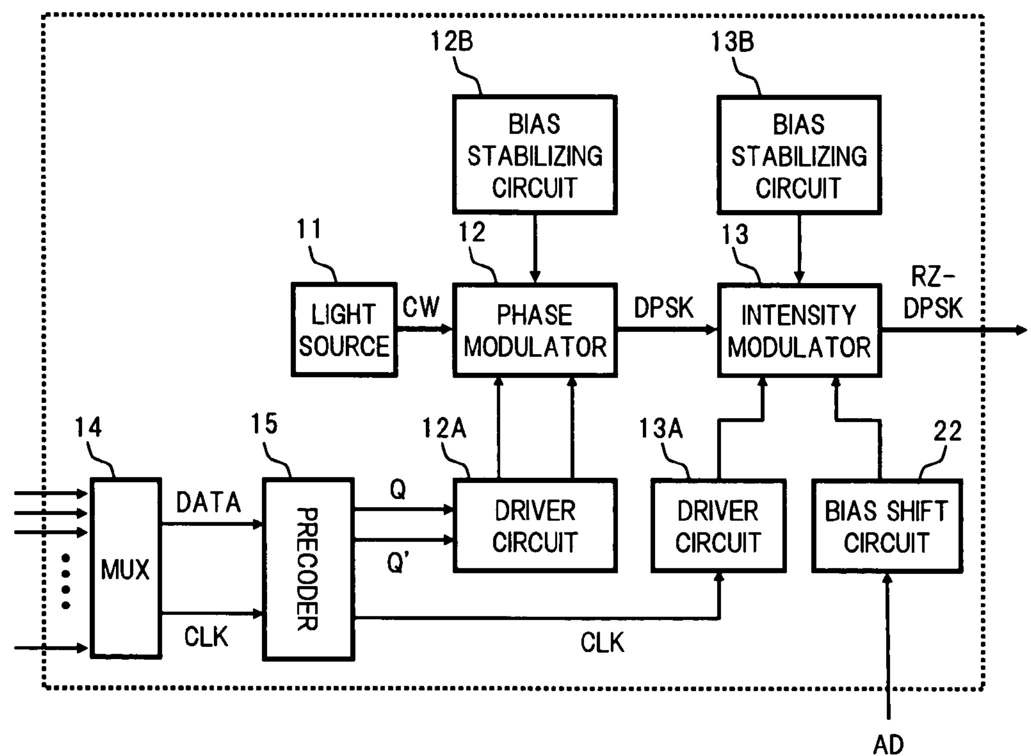
FIG. 7 is a block diagram showing the structure of an optical transmitter according to a second embodiment of the present invention.

FIG. 7 is a block diagram showing the structure of an optical transmitter according to the second embodiment of the present invention.

In FIG. 7, in the present optical transmitter, a bias shift circuit 22 for offsetting the operating point of the intensity modulator 13 that performs pulse carving by a predetermined amount in a preset direction is provided in the structure of the conventional RZ-DPSK optical transmitter shown for example in FIG. 11. The structure of the present embodiment differs from the case of the first embodiment in the point that the bias shift circuit 22 is provided instead of the waveform transformation circuit 21 in the structure of the first embodiment. The other structure is similar to the case of the first embodiment. Therefore, a specific description will be given here focusing on the structure and operation of the bias shift circuit 22.

Figure 8:
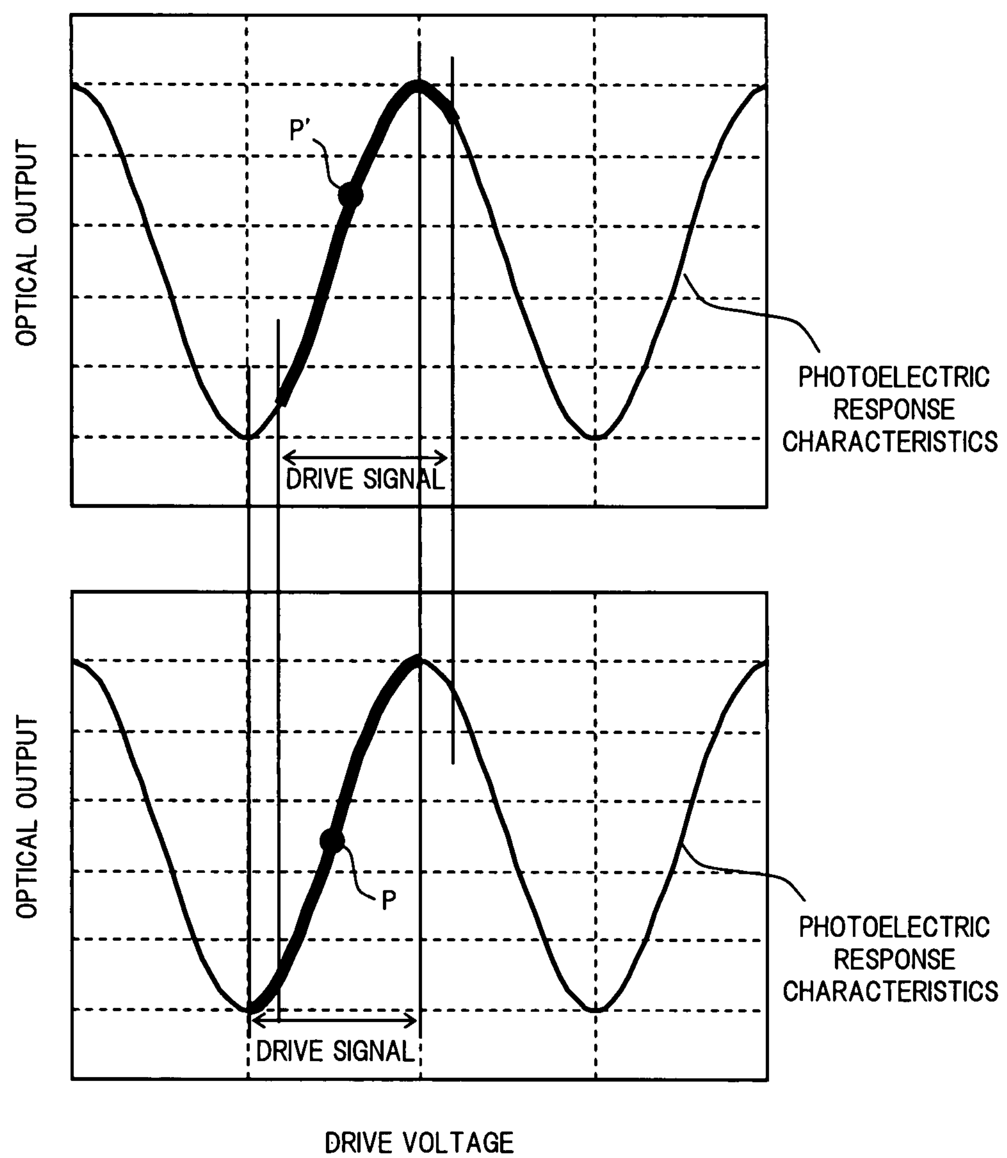
FIG. 8 is a diagram for explaining the setting of the operating points of an intensity modulator in the second embodiment.

In the first embodiment described previously, the intensity modulator 13 that performs pulse carving is driven with the central part between a trough and a crest of the photoelectric response characteristics as an operating point P, as shown at the bottom of FIG. 8. In the second embodiment, the setting of the operating point P of the intensity modulator 13 is offset to a point P', wherein it is shifted towards the crest side of the photoelectric response characteristics of the intensity modulator 13 by the bias shift circuit 22 as shown at the top of FIG. 8.

To be specific, the bias shift circuit 22 shifts the operating point of the intensity modulator 13 towards the crest side by adding a bias corresponding to the offset amount to the DC bias in which drift compensation for the operating point is performed by a bias stabilizing circuit 13B, or by supplying an offset to an error signal (signal indicating the amount of drift of the operating point) detected in the bias stabilizing circuit 13B. The offset amount of the operating point is set according to the duty adjustment signal AD supplied externally to the bias shift circuit 22.

Figure 9:
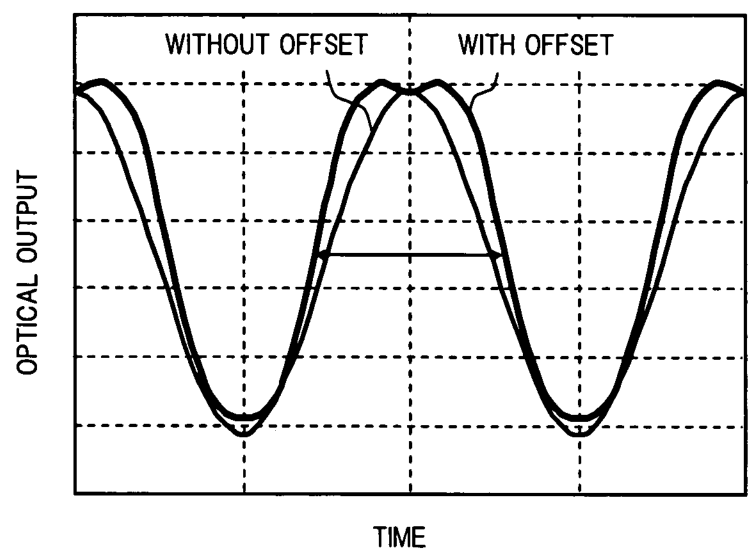
FIG. 9 is a diagram illustrating the waveform of an RZ-DPSK optical signal according to the second embodiment.

At the operating point P' offset by the bias shift circuit 22 as described above, the intensity modulator 13 is driven according to the modulation voltage corresponding to the clock signal CLK having a duty cycle of 50%, so that the RZ-DPSK optical signal pulse carved by the intensity modulator 13 becomes an optical waveform as shown by the thick line of FIG. 9, and the duty cycle becomes greater than 50%. As a result since the width of the optical spectrum is restricted as described previously, cross talk between adjacent channels can be reduced, which enables the spacing between channels to be reduced. Furthermore, regarding the chirp characteristics of the optical transmitter, since pulse carving is basically performed using the slope from a trough to a crest in the photoelectric response characteristics of the intensity modulator 13, a fixed state is realized in which the $\alpha$ parameter=1. Therefore, it is also possible to effectively limit waveform deterioration due to the SPM-GVD effect.

As described above, according to the optical transmitter of the second embodiment, since the bias shift circuit 22 is provided, and the operating point of the intensity modulator 13 that performs pulse carving is offset towards a crest side of the photoelectric response characteristics, it is possible to satisfy, at the same time, duty cycle and chirp characteristics that enable excellent transmission characteristics to be realized.

In the second embodiment, a case is described in which the operating point of the intensity modulator 13 is offset towards the crest side of the photoelectric response characteristics to make the duty cycle of the RZ-DPSK optical signal greater than 50%. However, the present invention is not limited to this, and the operating point of the intensity modulator 13 may be offset towards the trough side of the photoelectric response characteristics to make the duty cycle of the RZ-DPSK optical signal less than 50%. In this case, since the width of the optical spectrum increases as described previously, although it is difficult to reduce the spacing between channels of the WDM light as when the duty cycle is increased, if the frequency characteristics of the optical receiver extend to high frequencies, it is possible to improve the receiver sensitivity. Furthermore, regarding the chirp characteristics of the optical transmitter, since a fixed state is realized in which the α parameter=1, it is also possible to effectively limit waveform deterioration due to the SPM-GVD effect.

Next is a description of an implementation example of a WDM optical transmission system using the respective optical transmitters of the abovementioned embodiments.

Figure 10:
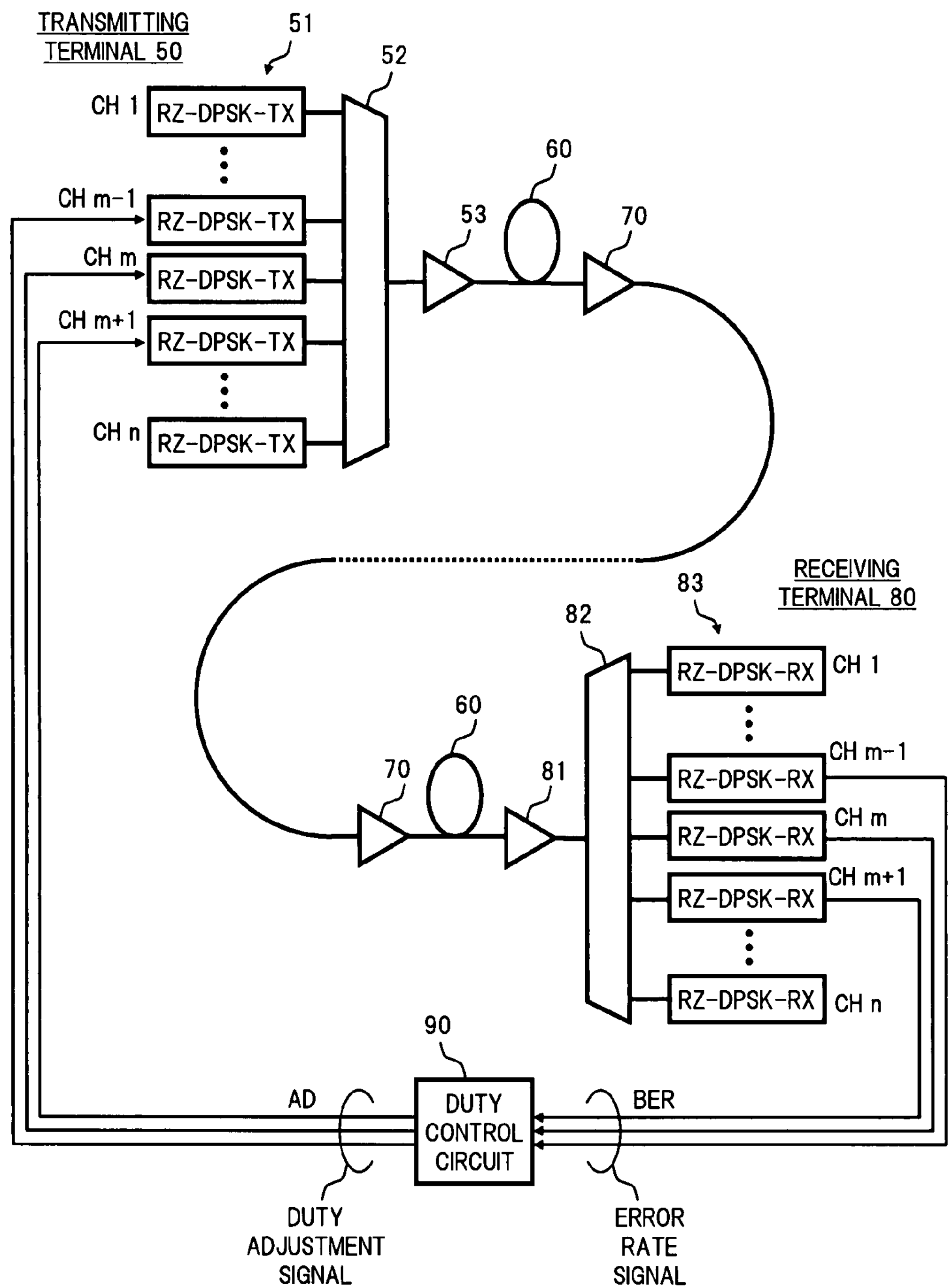
FIG. 10 is a block diagram showing the structure of an implementation example of an optical transmission system according to the present invention.

FIG. 10 is a block diagram showing the structure of one implementation example of the WDM optical transmission system.

In the WDM optical transmission system shown in FIG. 10, a plurality of optical transmitters (RZ-DPSK-TX) 51 of the abovementioned first or second embodiments is provided in a transmitting terminal 50, and RZ-DPSK optical signals CH1 to CHn of n different wavelengths output from each of the optical transmitters 51 are multiplexed by a multiplexer 52, after which they are amplified to a required level by a post amplifier 53, and transmitted to an optical transmission line 60. Repeaters 70 are placed on the transmission line 60 at required intervals, and the WDM light transmitted through the optical transmission line 60 is amplified by each of the repeaters 70 and transmitted to a receiving terminal 80. The WDM light reaching the receiving terminal 80 is amplified by the pre-amplifier 81, and then separated into each of the RZ-DPSK optical signals CH1 to CHn by a demultiplexer 82 according to wavelength, and received by respective optical receivers (RZ-DPSK-RX) 83 corresponding to each.

At this time, the bit error rates (BER) of each of the received signals are measured in respective optical receiver 83, and each error rate signal BER indicating a measurement result is output to a duty control circuit 90. Here, each of the optical receivers 83 functions as an error rate measurement section. In the duty control circuit 90, a duty adjustment signal AD is generated based on the error rate signal BER corresponding to each wavelength, and each of the duty adjustment signals AD is output to a corresponding optical transmitter 51 in the transmitting terminal 50. FIG. 10 only shows the error rate signals BER and the paths of the duty adjustment signals AD corresponding to three RZ-DPSK optical signals CHm−1, CHm and CHm+1. The error rate signals BER and the paths of the duty adjustment signals AD corresponding to the other RZ-DPSK optical signals are omitted from the diagram.

Here is a description of the operation of the duty control circuit 90 using a specific example.

In the duty control circuit 90, on receiving the error rate signals BER from each of the optical receivers 83, the information is stored in an internal memory or the like. Then for example, the bit error rate of the RZ-DPSK optical signal CHm is read, a duty adjustment signal AD for optimizing the duty cycle of the RZ-DPSK optical signal CHm is generated based on the bit error rate, and is output to a corresponding optical transmitter 51. In the optical transmitter 51 that receives the duty adjustment signal AD from the duty control circuit 90, an RZ-DPSK optical signal CHm whose duty cycle is changed from 50% is generated according to the duty adjustment signal AD as described in each of the embodiments. The RZ-DPSK optical signal CHm is then transmitted to the optical transmission line 60 via the multiplexer 52 and the post amplifier 53, repeated up to the receiving terminal 80, received by a corresponding optical receiver 83 where the bit error rate is measured again, and the result is transmitted to the duty control circuit 90.

In the duty control circuit 90, the bit error rate measured after the adjustment of the duty cycle is compared with the bit error rate measured before the adjustment, and in the case where the adjustment of the duty cycle has caused the bit error rate to deteriorate, the setting of the duty cycle is returned to the original state. On the other hand, in the case where the adjustment of the duty cycle has caused the bit error rate to improve, it is confirmed whether or not the bit error rates of the RZ-DPSK optical signals CHm−1 and CHm+1, whose wavelengths are adjacent, have deteriorated significantly due to the adjustment concerned. In the case where the amount of deterioration of the RZ-DPSK optical signals CHm−1 and CHm+1 is greater than a previously set prescribed amount, the setting of the duty cycle of the RZ-DPSK optical signal CHm is returned to the state before the adjustment. On the other hand, in the case where the amount of deterioration of the RZ-DPSK optical signals CHm−1 and CHm+1 is less than the abovementioned prescribed amount, the duty cycle of the RZ-DPSK optical signal of another wavelength is adjusted while the setting of the duty cycle of the RZ-DPSK optical signal CHm is maintained. Then by repeated optimization of the duty cycle as described above for the RZ-DPSK optical signals of all wavelengths, excellent transmission of the WDM light can be realized.

In the first and second embodiments and the implementation example of the optical transmission system, an optical transmitter corresponding to an RZ-DPSK modulation format is described. However, the present invention is also effective in an optical transmitter corresponding to an RZ-DQPSK modulation format similarly to the RZ-DPSK modulation format.

What is claimed is:

1. An optical transmitter that comprises:

a light source;

a phase modulator into which a light output from said light source is input; a first drive circuit that drives said phase modulator according to a data signal;

an intensity modulator into which the light whose phase is modulated by said phase modulator is input, and said intensity modulator has photoelectric response characteristics that change periodically; and a second drive circuit that drives said intensity modulator in accordance with a clock signal having a frequency corresponding to a bit rate of said data signal, and said optical transmitter outputs an optical signal of a phase modulation format, pulse carved by said intensity modulator, wherein there is provided a waveform transformation circuit that varies a duty cycle of said clock signal while keeping an amplitude of said clock signal constant, and said second drive circuit drives said intensity modulator in accordance with a clock signal in which the duty cycle is changed to a different value from 50% and the amplitude is the same as said clock signal by said waveform transformation circuit, with the operating range being a slope from a trough to a crest in the photoelectric response characteristics of said intensity modulator.

2. An optical transmitter according to claim 1, wherein said waveform transformation circuit makes the duty cycle of said clock signal greater than 50%.

3. An optical transmitter according to claim 1, wherein said waveform transformation circuit makes the duty cycle of said clock signal less than 50%.

4. An optical transmitter according to claim 1, wherein said phase modulator phase modulates a light from said light source using either a DPSK modulation format or a DQPSK modulation format.

5. An optical transmitter according to claim 1, wherein said waveform transformation circuit comprises an AND operation circuit.

6. An optical transmitter according to claim 1, wherein said waveform transformation circuit comprises an OR circuit.

7. An optical transmitter according to claim 1, wherein said waveform transformation circuit comprises an EXCLUSIVE OR circuit.

8. An optical transmission system in which a WDM light, in which a plurality of optical signals of different wavelengths is multiplexed, is transmitted between a transmitting terminal and a receiving terminal, wherein a plurality of optical transmitters according to claim 1 is provided in said transmitting terminal.

9. An optical transmission system according to claim 8, wherein said receiving terminal has an error rate measurement section in which error rates of the optical signals of each wavelength contained in the received WDM light are measured, and error rate signals indicating the respective measurement results are output, and there is provided a duty control circuit that, based on the error rate signals output from said error rate measurement section, generates duty adjustment signals for adjusting the duty cycle of the optical signals output from each of the optical transmitters in said transmitting terminal, and outputs each of said duty adjustment signals to the corresponding optical transmitter, and each of said optical transmitters changes the duty cycle of an output light according to the duty adjustment signals from said duty control circuit.

* * * * *